United States Patent
Terada

(10) Patent No.: US 8,014,085 B2
(45) Date of Patent: Sep. 6, 2011

(54) LENS APPARATUS AND IMAGE PICKUP APPARATUS

(75) Inventor: Shuichi Terada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 12/507,519

(22) Filed: Jul. 22, 2009

(65) Prior Publication Data

US 2010/0027138 A1   Feb. 4, 2010

(30) Foreign Application Priority Data

Jul. 31, 2008   (JP) .................................. 2008-197759

(51) Int. Cl.
*G02B 7/02* (2006.01)
(52) U.S. Cl. ......................... 359/817; 359/819; 359/822
(58) Field of Classification Search .................. 359/817, 359/819–30
See application file for complete search history.

(56) References Cited

U.S. PATENT DOCUMENTS

| 2005/0207744 A1 | 9/2005 | Yano |
| 2008/0055743 A1* | 3/2008 | Sato .............................. 359/809 |

FOREIGN PATENT DOCUMENTS

| JP | 05-150152 | 6/1993 |
| JP | 2005-274631 | 10/2005 |
| JP | 2006-250963 | * 9/2006 |
| JP | 2006-250963 A | 9/2006 |
| JP | 2007-033556 | 2/2007 |

OTHER PUBLICATIONS 2006-250963 translation; Sep. 2006.*
The above reference was cited in a Aug. 2, 2010 Chinese Office Action, a copy of which is enclosed with English Translation, that issued in Chinese Patent Application No. 200910159200.0.

* cited by examiner

*Primary Examiner* — Mohammed Hasan
(74) *Attorney, Agent, or Firm* — Cowan, Liebowitz & Latman, P.C.

(57) ABSTRACT

A lens apparatus includes a first lens holding member configured to hold a lens, and an actuator configured to move the first lens holder in an optical axis direction. The lens apparatus transfers to a retracted state by moving the first lens holding member to a retracted position via the actuator from an image picking-up state. The lens apparatus further includes a stopper configured to move in a direction different from the optical axis direction between a first position at which the stopper restricts a movement of the first lens holding member and a second position off the first position, and a driving member configured to move the stopper from the second position to the first position relative to the first lens holding member that has moved to the retreated position.

6 Claims, 15 Drawing Sheets

US 8,014,085 B2

LENS APPARATUS AND IMAGE PICKUP APPARATUS

BACKGROUND OF THE INVENTION

1. Field of the Invention

The present invention relates to an image pickup apparatus, such as a digital camera, which includes a lens apparatus equipped with a voice coil motor ("VCM") that is configured to move a lens in an optical axis direction.

2. Description of the Related Art

The actuator used for the lens apparatus to move a lens in the optical axis direction includes a stepping motor, a vibration type motor, a VCM, etc.

Japanese Patent Laid-Open No. ("JP") 5-150152 discloses a lens apparatus that uses a VCM as an actuator. This lens apparatus configures the VCM by providing a coil to a lens holder that holds the lens, and a magnet that is opposite to part of the coil and extends in the optical axis direction. As the coil is supplied with current, a thrust occurs in the optical axis due to the interaction between the magnetic flux generated by the magnet and the magnetic flux generated by the coil, and drives the lens holder in the optical axis direction.

However, the VCM does not possess a magnetic or frictional stopping and maintaining power in the non-electrification state unlike the stepping motor or the vibration type motor, and thus needs a mechanism for stopping the lens holder driven by the VCM (which will be referred to as a "VCM lens holder" hereinafter), when the lens apparatus (or the image pickup apparatus provided with the lens apparatus) is powered off and the VCM becomes in the non-electrification state. This is because when the lens apparatus receives a vibration or a shock in the non-electrification state of the VCM, the VCM lens holder is likely to move and to collide with another lens holder or component, causing a collision noise or lowering an optical characteristic.

JP 2005-274631 discloses a lens apparatus that restricts a movement of the VCM lens holder in the non-electrification state of the VCM by using another lens holder that moves in the optical axis direction in association with a retraction from a usable position (image picking-up position) when the power is off.

JP 2007-033556 discloses a lens apparatus that restricts a movement of the VCM lens holder in the non-electrification state of the VCM by using a lens barrier unit that moves in the optical axis direction in association with the retraction.

These lens apparatuses disclosed in JPs 2005-274631 and 2007-033556 thus restrict a movement of the VCM lens holder by using the other lens holder or the lens barrier (collectively a "stopper" hereinafter) configured to move in the optical axis direction in association with the retraction, but have the following disadvantages: The stopper can restrict the movement of the VCM lens holder only when a moving amount of the stopper in association with the retraction is large than a moving amount of the VCM lens holder.

In other words, when the moving amount of the VCM lens holder in association with the retraction is larger than the moving amount of the other lens holder or the lens barrier unit, the other lens holder or the lens barrier unit cannot be used as the stopper.

SUMMARY OF THE INVENTION

The present invention provides an lens apparatus configured to restrict a movement of a lens holding member in a non-electrification state of an actuator, even when a moving amount of the lens holding member driven by an actuator in a retraction is larger than a moving amount of the other lens holder, etc. The present invention also provides an image pickup apparatus that includes the above lens apparatus.

A lens apparatus according to one aspect of the present invention includes a first lens holding member configured to hold a lens, an actuator configured to move the first lens holder in an optical axis direction, the lens apparatus transferring to a retracted state by moving the first lens holding member to a retracted position via the actuator from an image picking-up state, a stopper configured to move in a direction different from the optical axis direction between a first position at which the stopper restricts a movement of the first lens holding member and a second position off the first position, and a driving member configured to move the stopper from the second position to the first position relative to the first lens holding member that has moved to the retreated position.

An image pickup apparatus having the above lens apparatus also constitutes another aspect of the present invention.

Further features of the present invention will become apparent from the following description of exemplary embodiments with reference to the attached drawings.

DESCRIPTION OF THE EMBODIMENTS

A description will be given of embodiments of the present invention with reference to the drawings.

First Embodiment

Figure 2:
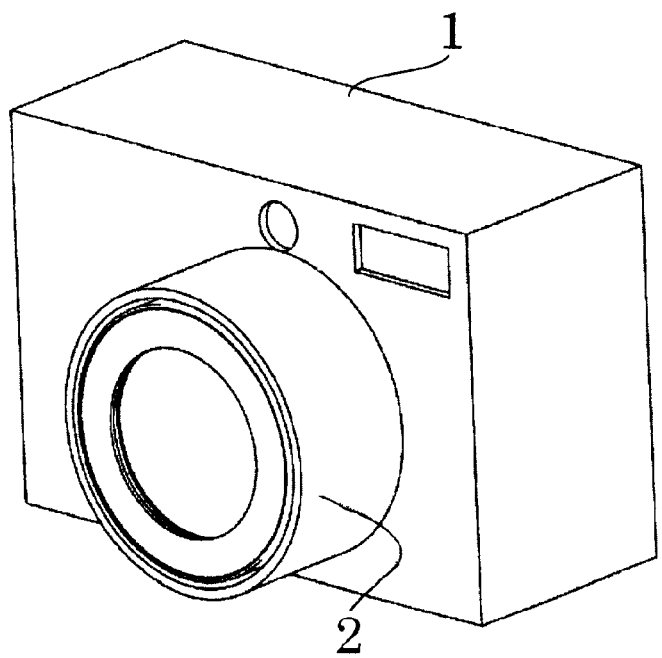
FIG. 2 is a perspective overview of the camera having the lens barrel according to the first embodiment.
Figure 3:
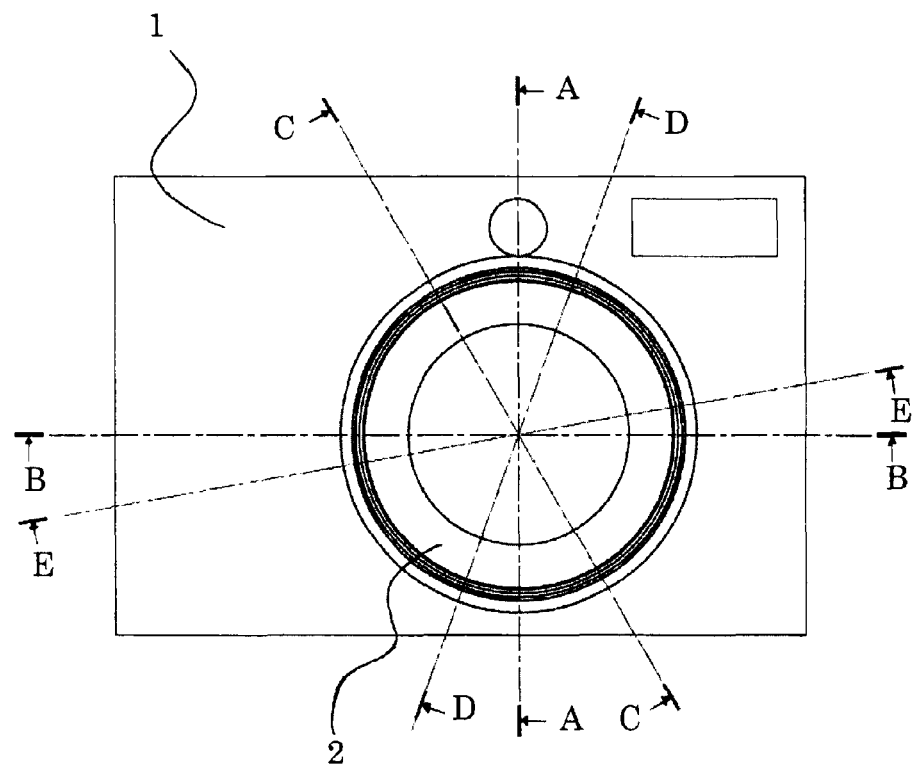
FIG. 3 is a front view of the camera shown in FIG. 2.

FIG. 2 is an overview of a camera (image pickup apparatus) mounted with a lens apparatus according to a first embodiment of the present invention. FIG. 3 is a front view of the camera.

Figure 5:
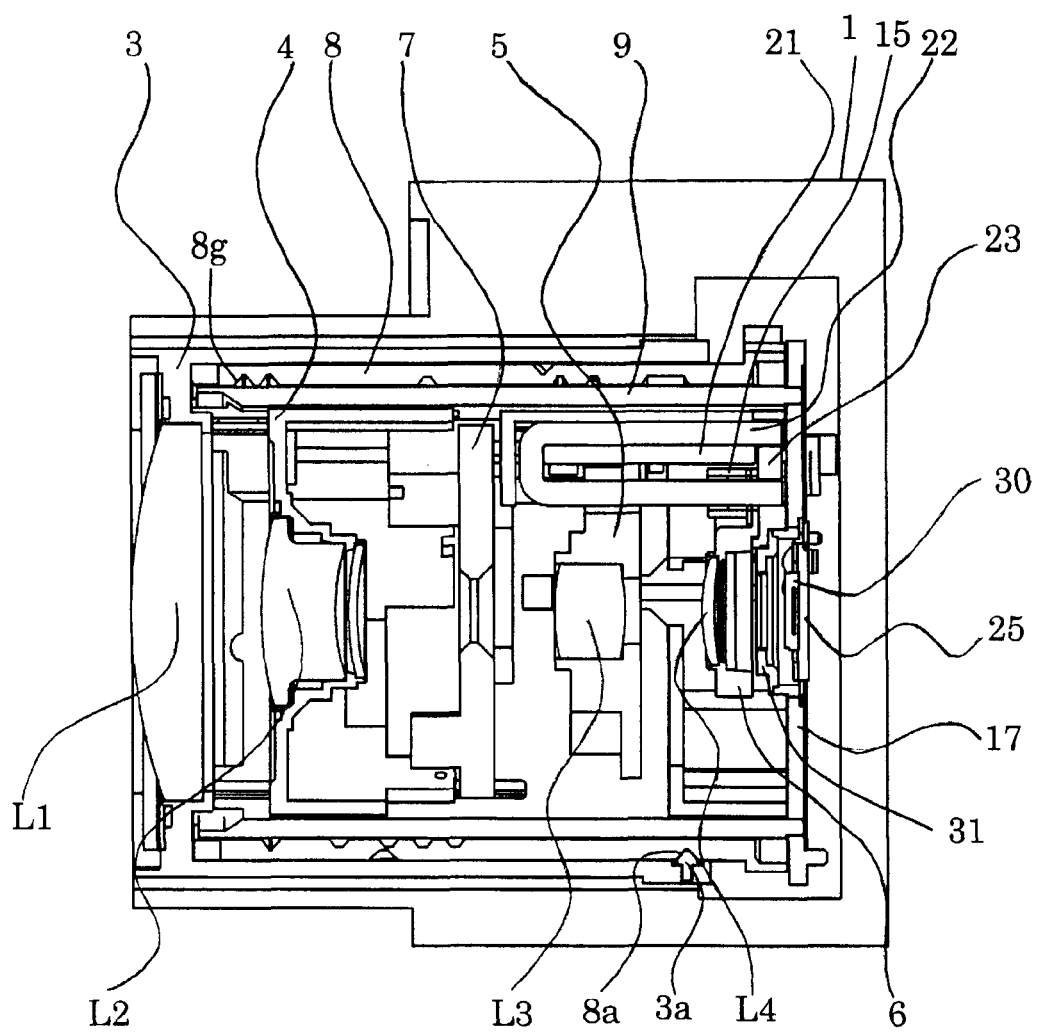
FIG. 5 is an A-A sectional view of the lens barrel in a collapsed state according to the first embodiment.

A collapsible (retractable) lens barrel (lens apparatus) 2 is provided to a front surface of the camera. The lens barrel 2 houses an image pickup optical system that includes, as shown in FIG. 5, in order from the object side, a first lens unit L1, a second lens unit L2, a third lens unit L3, and a fourth lens unit L4. In focusing, the fourth lens unit L4 is moved in the optical axis direction of the image pickup optical system.

Figure 1:
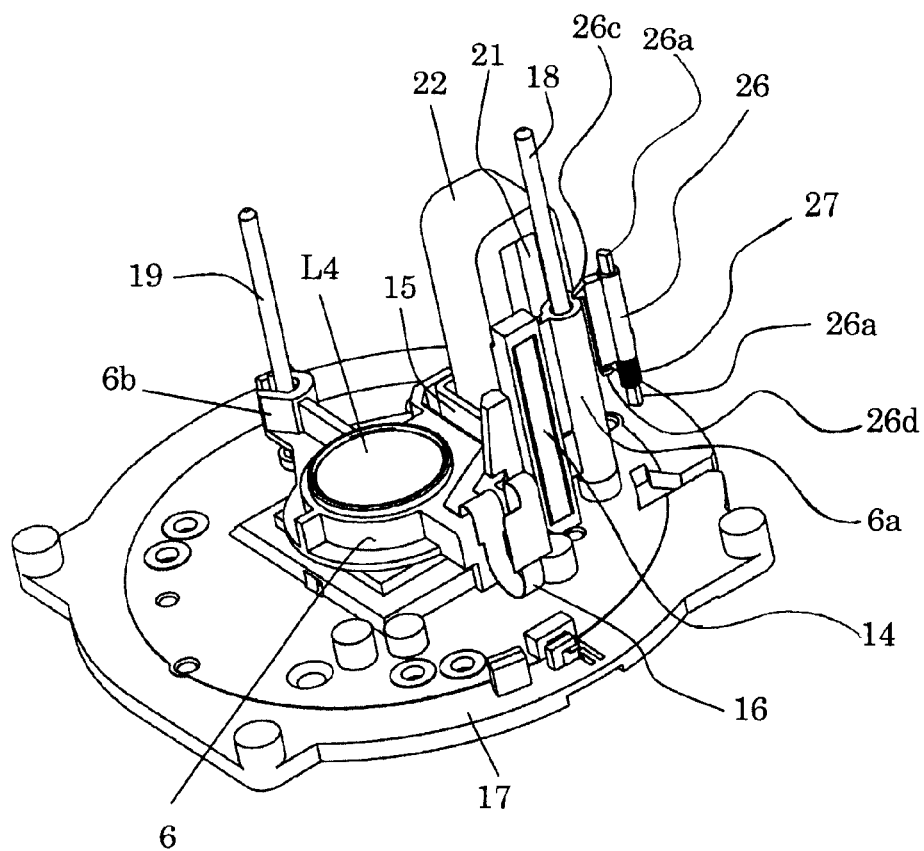
FIG. 1 is a perspective view showing a VCM and a VCM lens holder in a collapsed state of a lens barrel according to a first embodiment of the present invention.
Figure 6:
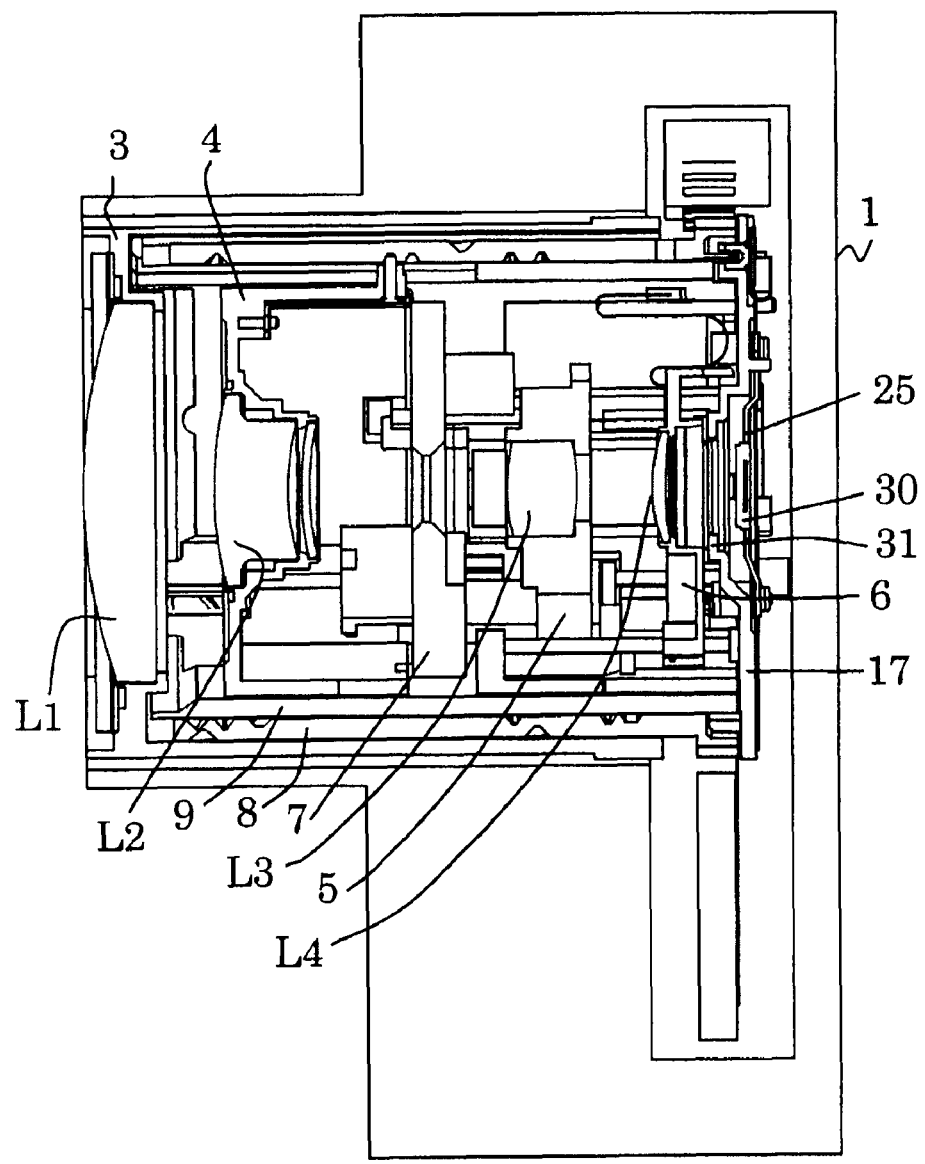
FIG. 6 is a B-B sectional view of the lens barrel in the collapsed state according to the first embodiment.
Figure 7:
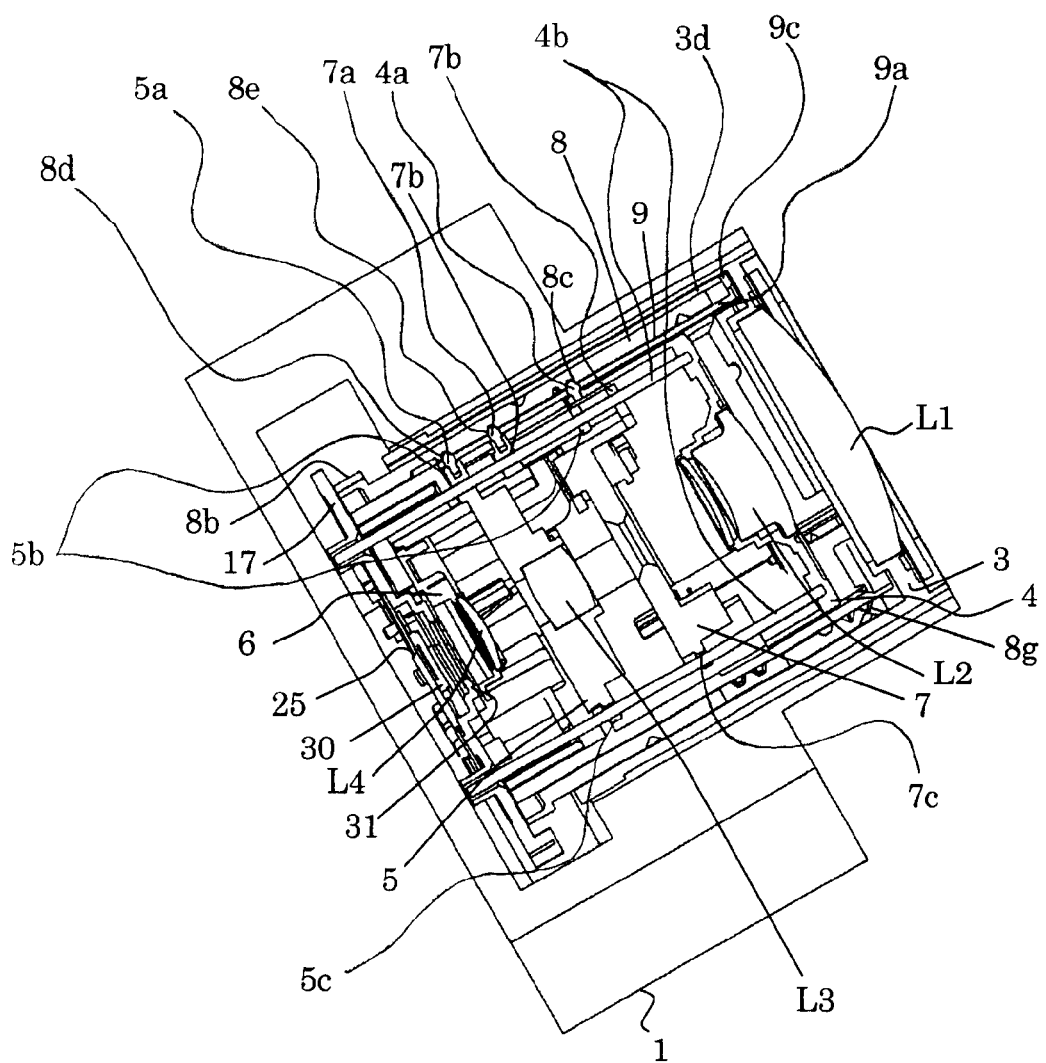
FIG. 7 is a C-C sectional view of the lens barrel in the collapsed state according to the first embodiment.
Figure 8:
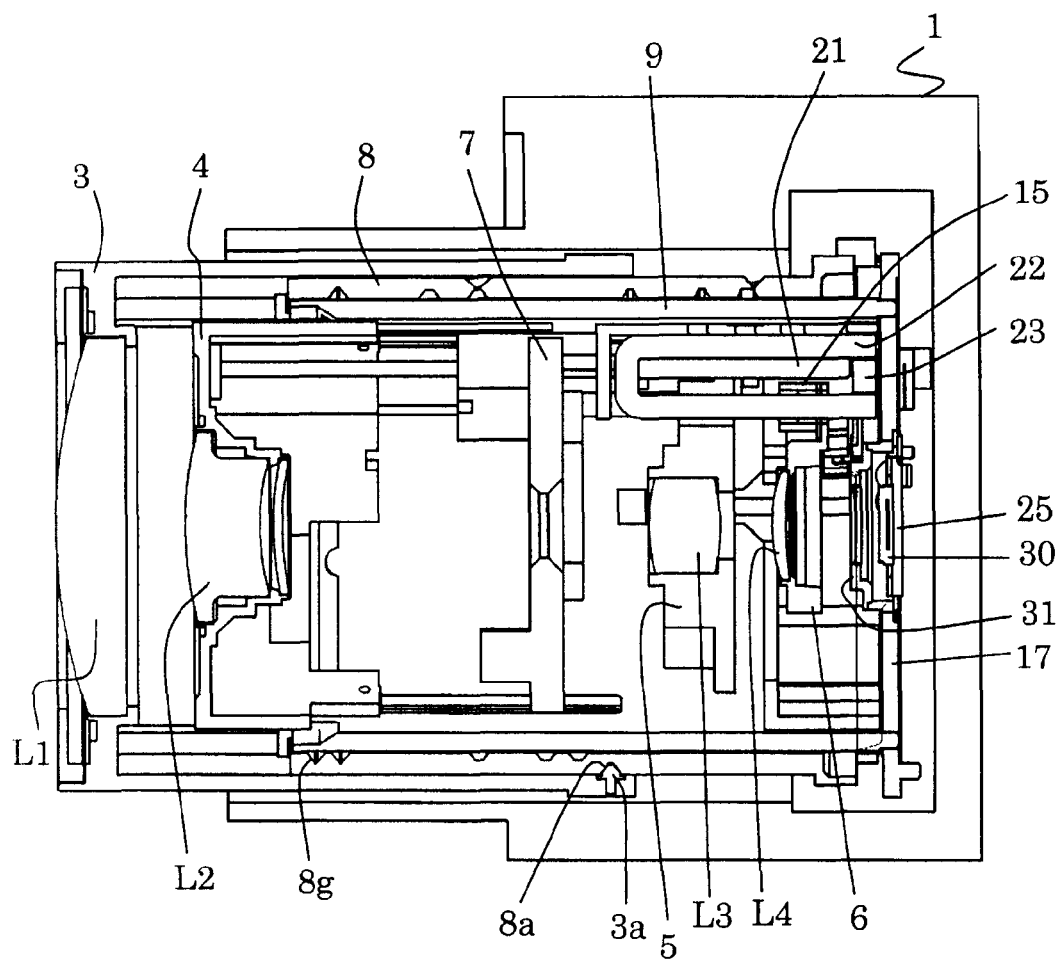
FIG. 8 is an A-A sectional view of the lens barrel in a wide-angle state according to the first embodiment.
Figure 9:
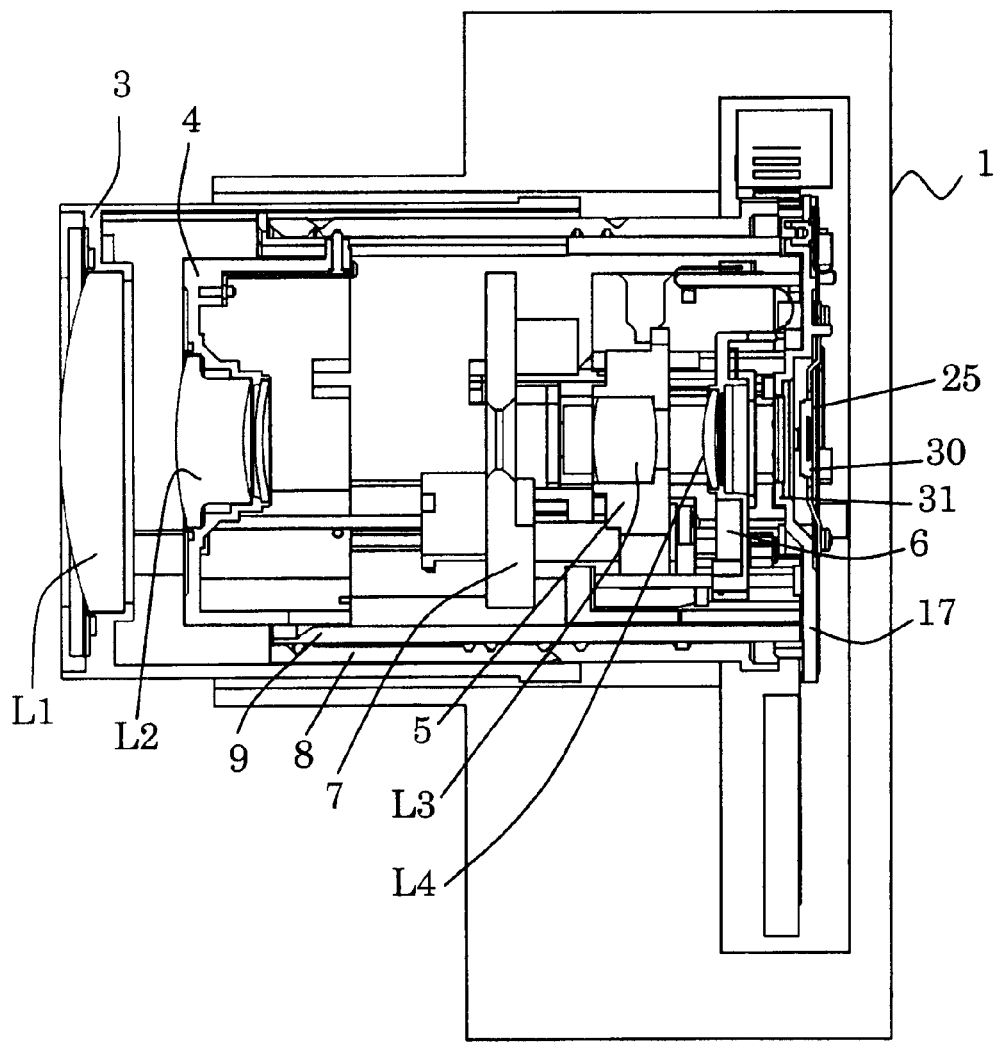
FIG. 9 is a B-B sectional view of the lens barrel in the wide-angle state according to the first embodiment.
Figure 10:
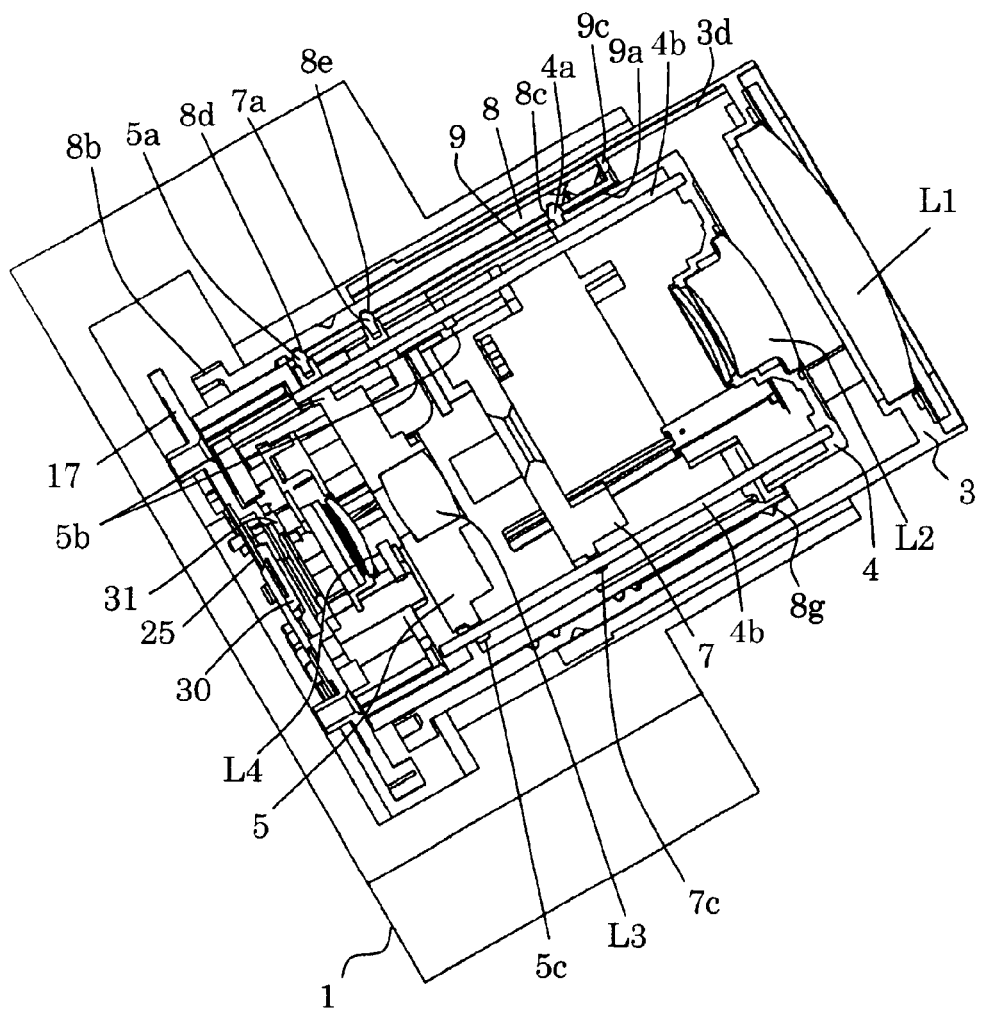
FIG. 10 is a C-C sectional view of the lens barrel in the wide-angle state according to the first embodiment.
Figure 11:
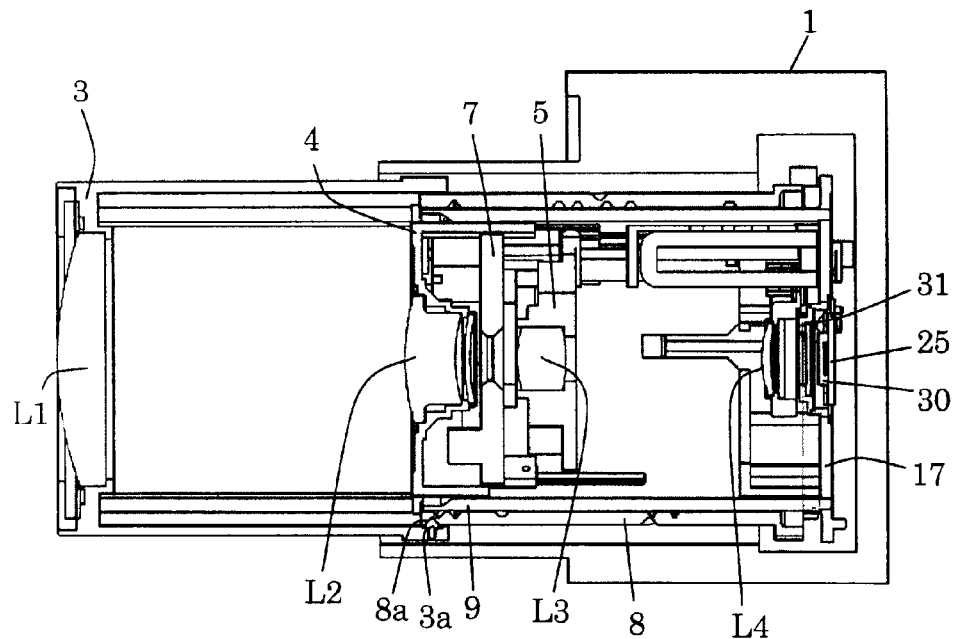
FIG. 11 is an A-A sectional view of the lens barrel in a telephoto state according to the first embodiment.
Figure 12:
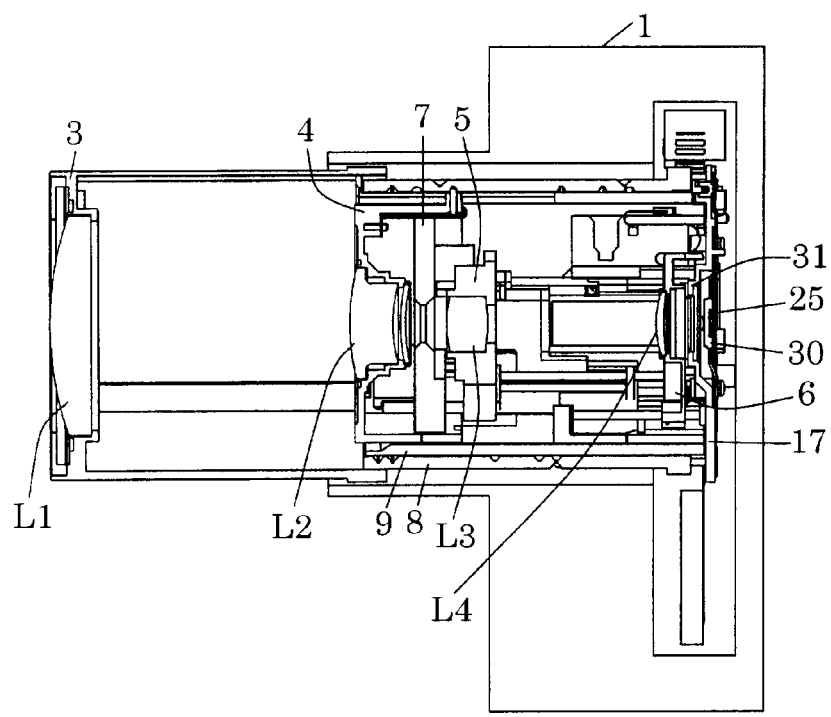
FIG. 12 is a B-B sectional view of the lens barrel in the telephoto state according to the first embodiment.
Figure 13:
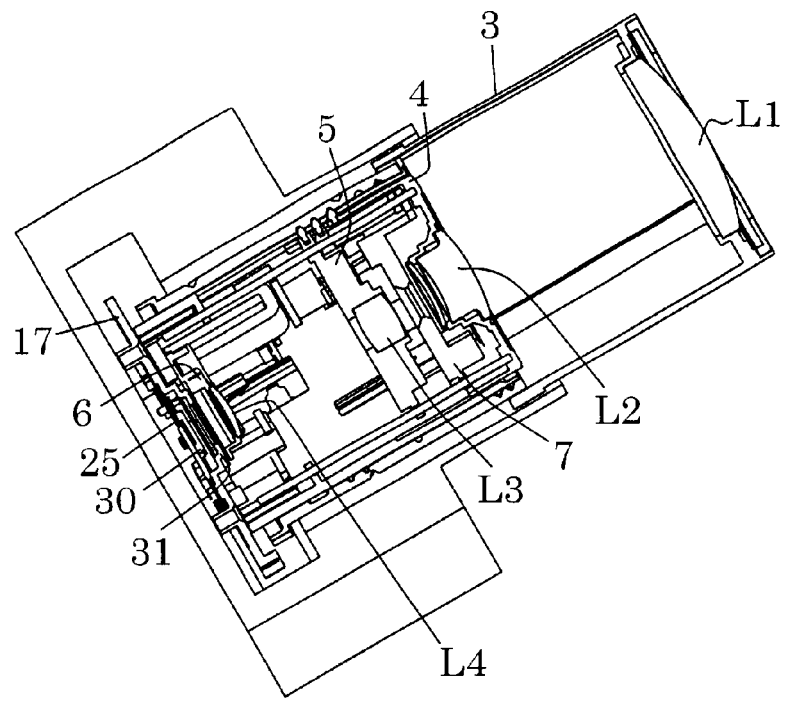
FIG. 13 is a C-C sectional view of the lens barrel in the telephoto state according to the first embodiment.

FIG. 1 shows a structure around the fourth lens unit L4 when the lens barrel 2 is in a collapsed state (retracted state). FIGS. 5, 6, and 7 are A-A, B-B, and C-C sectional views of the internal structure the lens barrel 2 in the collapsed state, as shown in FIG. 3. FIGS. 8, 9, and 10 are A-A, B-B, and C-C sectional views of the internal structure of the lens barrel 2 in the wide-angle state (image picking-up state), as shown in FIG. 3. FIGS. 11, 12, and 13 are A-A, B-B, and C-C sectional views of the internal structure of the lens barrel 2 in the telephoto state, as shown in FIG. 3.

In these figures, the first lens unit L1 is held by a first lens holder 3. The first lens holder 3 includes a first cam pin 3a and a first forward-movement groove 3d.

The second lens unit L2 is held by a second lens holder 4. The second lens holder 4 includes a second cam pin 4a. The second lens holder 4 holds one end of each of a pair of guide bars 4b which extends in the optical axis direction.

The third lens unit L3 is held by a third lens holder (second lens holding member) 5. The third lens holder 5 includes a third cam pin 5a, a sleeve member 5b engaged with one guide bar 4b so that the sleeve member 5b can move in the optical axis direction, and a rotation-stopping U-shaped groove member 5c engaged with the other bar 4b.

The fourth lens unit L4 is held by a VCM lens holder (first lens holding member) 6.

A shutter unit 7 includes a SH cam pin 7a, a sleeve member 7b engaged with one guide bar 4b so that the sleeve member 7b can move in the optical axis direction, and a rotation-stopping U-shaped groove 7c engaged with the other bar 4b.

A cam barrel 8 and a fixed barrel 9 are provided inside of the first lens holder 3 and outside of the second lens holder 4.

The cam barrel 8 is configured rotatable around the optical axis outside of the fixed barrel 9, and a first cam groove member 8a and a gear member 8b are formed on an outer circumference part of the cam barrel 8. A second cam groove member 8c, a third cam groove member 8d, a SH cam groove member 8e, a stopper retreat groove member 8f, and a cam-barrel driving cam groove member 8g are formed on an inner circumference part of the cam barrel 8.

Three second forward-movement groove members 9a that extends in the optical axis direction and perforates in the radial direction (orthogonal to the optical axis) and three cam pins 9b are provided to a circumferential wall part of the fixed barrel 9 in the circumferential direction. A first forward-movement key 9c is formed at an outer circumferential end that has a phase equal to the second forward-movement groove member 9a of the fixed barrel 9. The second cam pin 4a is engaged with the second forward-movement groove member 9a. The fixed barrel's cam pin 9b is engaged with the cam-barrel driving cam groove member 8g of the cam barrel 8. The first forward-movement key 9c is engaged with the first forward-movement groove member 3d of the first lens holder 3.

Figure 4:
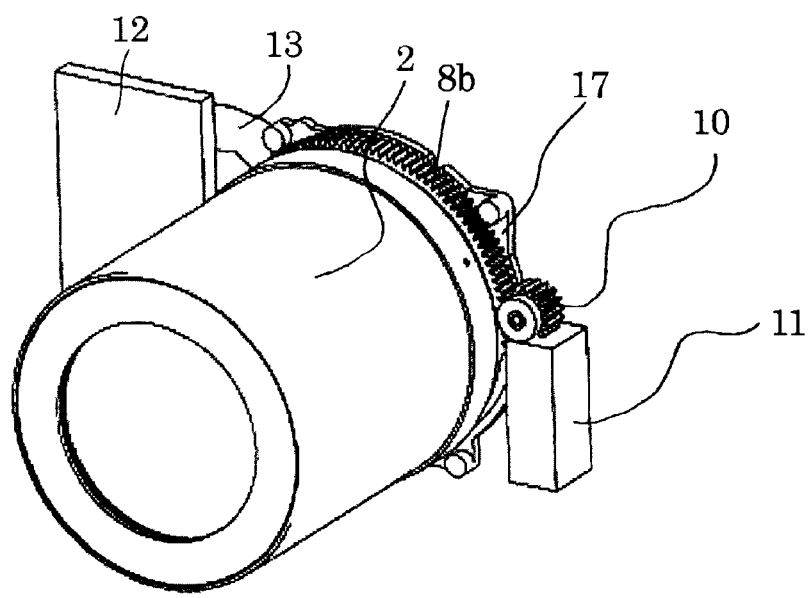
FIG. 4 is a perspective view of the lens barrel according to the first embodiment.

In FIG. 4, reference numeral 10 denotes a drive gear, and reference numeral 11 denotes a zoom motor. Reference numeral 12 denotes a main substrate, and reference numeral 13 denotes a barrel flexible printed board. Reference numeral 17 denotes an image pickup element holder.

When the zoom motor 11 is electrified via the barrel flexible printed board 13 from the main substrate 12, the drive gear 10 is rotated by the zoom motor 11. Since the drive gear 10 is engaged with the gear member 8b of the cam barrel 8, the cam barrel 8 rotates outside of the fixed barrel 9.

As the cam barrel 8 rotates, the first lens holder 3 in which the first cam pin 3a is engaged with the first cam groove member 8a of the cam barrel 8 moves in the optical axis direction while guided by the first forward-movement key 9c by the lift of the first cam groove member 8a. The second lens holder 4 in which the second cam pin 4a is engaged with the second cam groove member 8c of the cam 8 moves in the optical axis direction while guided by the second forward-movement groove member 9a by the lift of the second cam groove member 8c. The third lens holder 5 in which the third cam pin 5a is engaged with the third cam groove member 8d of the cam barrel 8 moves in the optical axis direction while guided by one guide bar 4b by the lift of the third cam groove member 8d. Moreover, the shutter unit 7 in which the SH cam pin 7a is engaged with the SH cam groove member 8e of the cam barrel 8 moves in the optical axis direction while guided by one guide bar 4b by the lift of the SH cam groove member 8e.

When the cam barrel 8 rotates in which the cam-barrel driving cam groove member 8g is engaged with the cam pin 9b of the fixed barrel 9, the cam barrel 8 rotates relative to the fixed barrel 9 and moves in the optical axis direction due to the lift of the cam-barrel driving cam groove member 8g.

Thus, when the first lens holder 3, the second lens holder 4, the third lens holder 5, the shutter unit 7, and the cam barrel 8 move in the optical axis direction, and the lens barrel 2 transfers from the collapsed state shown in FIGS. 5-7 to the wide-angle state shown in FIGS. 8-10. When the cam barrel 8 further rotates, the lens barrel 2 transfers to the telephoto state shown in FIGS. 11-13.

The main substrate 12 is connected to an image pickup element (image sensor) 30 attached onto an image pickup element substrate 25 via wires (not shown). The image pickup element substrate 25 is attached to the image pickup element holder 17. The image pickup element 30 may use a CCD sensor or a CMOS sensor. The image pickup element 30 photoelectrically converts an object image formed by the image pickup optical system, and outputs an image pickup signal. An image is formed based on the image pickup signal. Reference numeral 31 denotes a filter holding part that holds an optical filter that has an infrared ray cutting and low-pass function, and is arranged on the front surface of the image pickup element 30. The filter holding part 31 is provided onto the image pickup holder 17.

Figure 14:
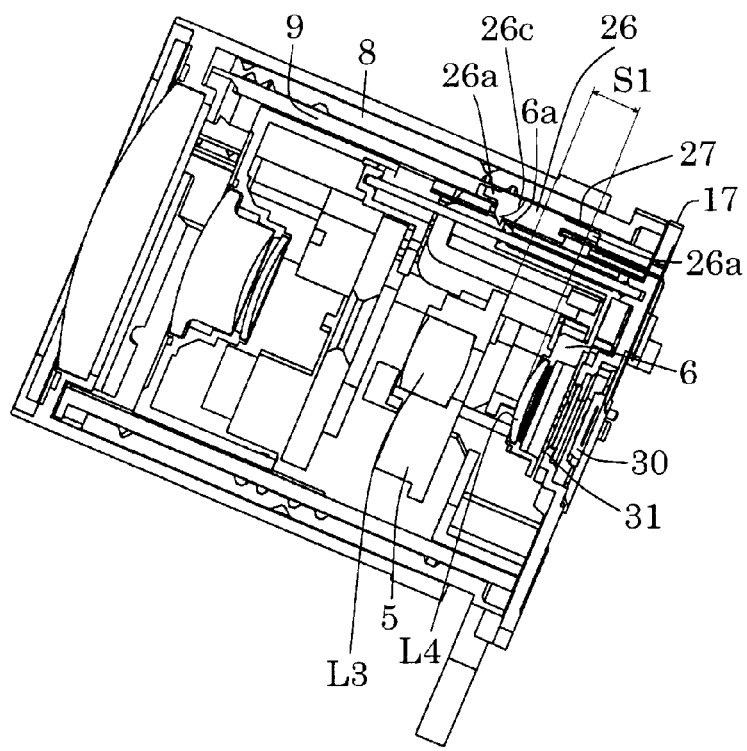
FIG. 14 is a D-D sectional view showing a relationship between a stopper and a VCM lens holder in the collapsed state of the lens barrel according to the first embodiment.
Figure 15:
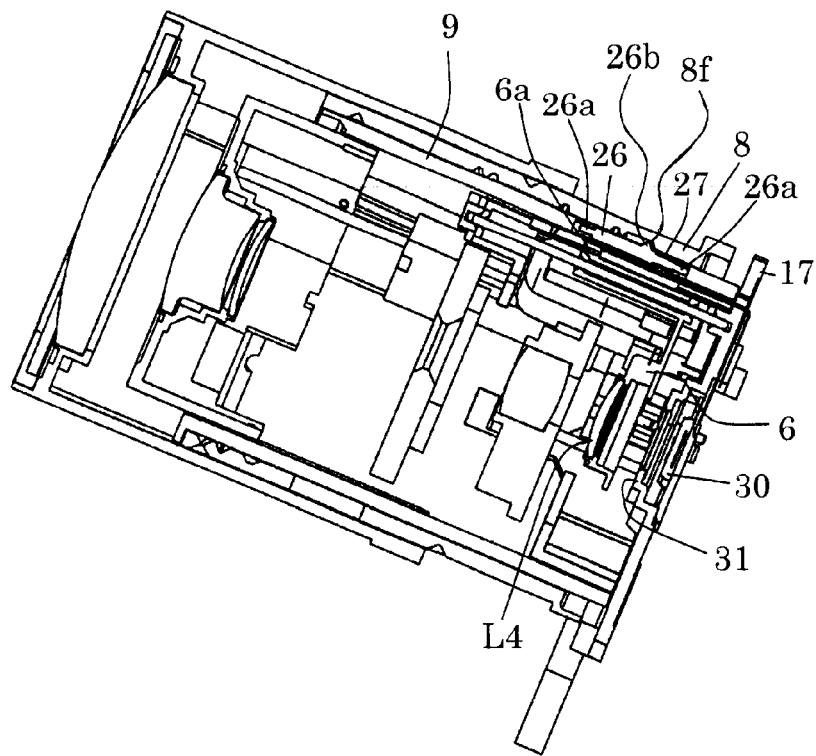
FIG. 15 is the D-D sectional view showing a relationship between the stopper and the VCM lens holder in the wide-angle state of the lens barrel according to the first embodiment.
Figure 16:
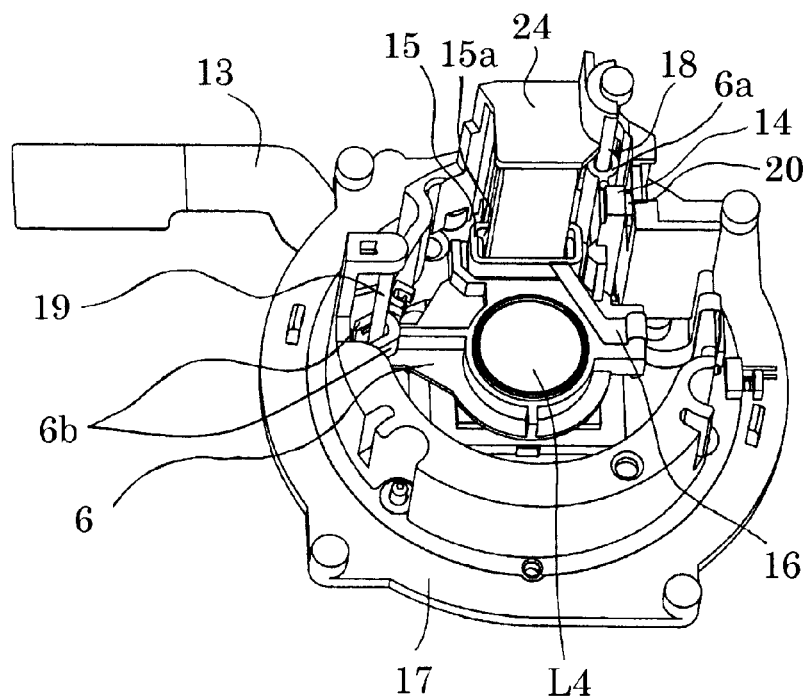
FIG. 16 is a perspective showing a peripheral structure of the VCM lens holder in the collapsed state of the lens barrel according to the first embodiment.
Figure 17:
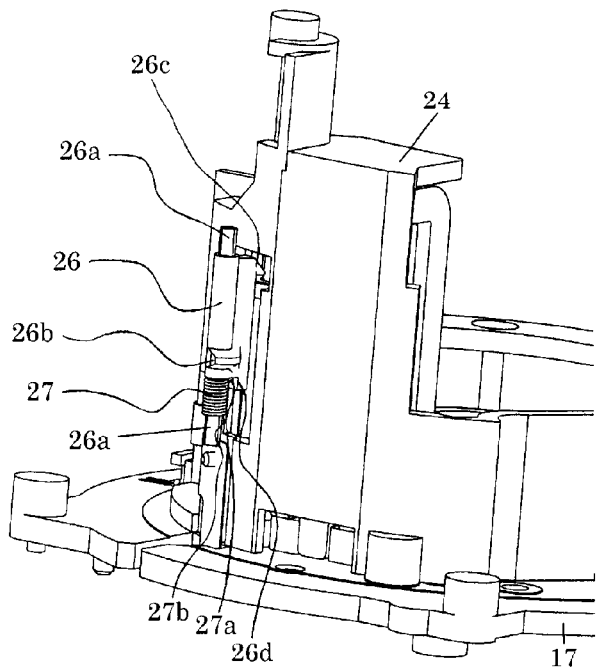
FIG. 17 is a perspective view of the stopper in the collapsed state of the lens barrel according to the first embodiment.
Figure 18:
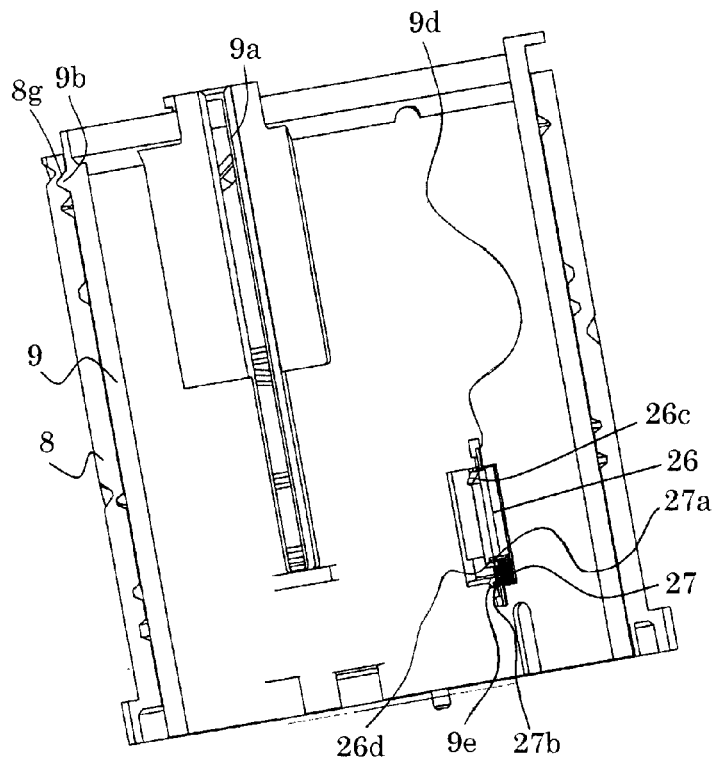
FIG. 18 is an E-E sectional view showing a relationship between the stopper, the cam barrel, and the fixed barrel in the collapsed state of the lens barrel according to the first embodiment.
Figure 19:
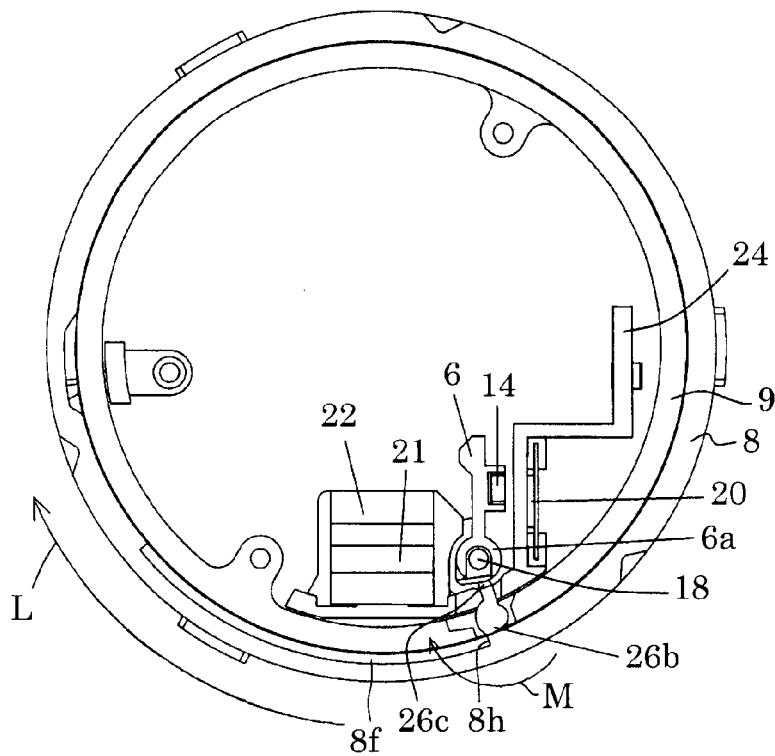
FIG. 19 is a sectional view orthogonal to the optical axis showing a relationship among the stopper, the cam barrel, and the fixed barrel in the collapsed state of the lens barrel according to the first embodiment.
Figure 20:
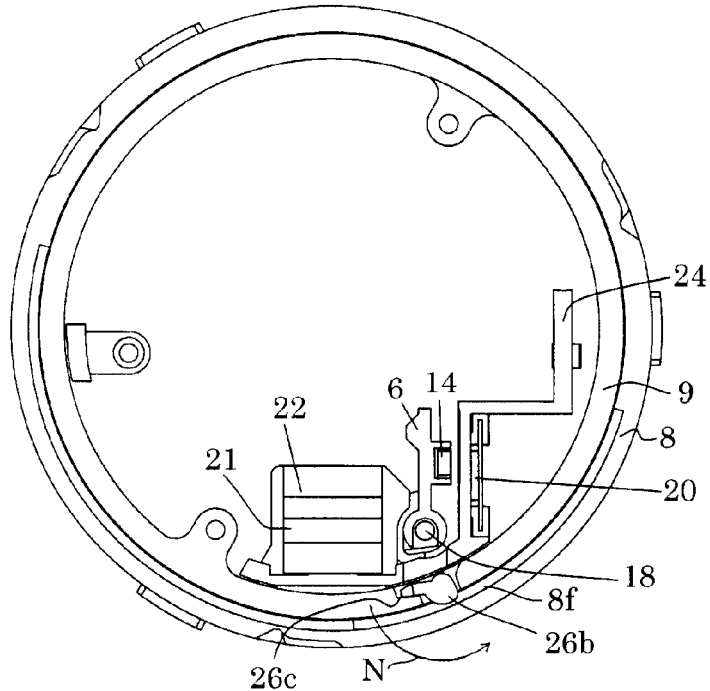
FIG. 20 is a sectional view orthogonal to the optical axis showing a relationship among the stopper, the cam barrel, and the fixed barrel in the wide-angle state of the lens barrel according to the first embodiment.

Referring now to FIGS. 1, 5, 8, and 14-20, a description will be given of the VCM unit configured to move the fourth lens unit L4 (VCM lens holder 6) in the optical axis direction. FIGS. 14 and 15 denote D-D sectional views shown in FIG. 3, FIG. 18 shows an E-E sectional view shown in FIG. 3, and FIGS. 19 and 20 are sections orthogonal to the optical axis.

The VCM lens holder 6 includes a sleeve member 6a engaged with the guide bar 18 so that the sleeve member 6a can move in the optical direction, and a rotation-stopping U-shaped groove member 6b engaged with the guide bar 19. The VCM lens holder 6 is provided with a scale 14.

A coil 15 is wound around an air core member 15a. The coil 15 is connected to the main substrate 12 via the VCM flexible printed board 16 and the above barrel flexible printed board 13.

The image pickup element holder 17 holds one end of each of the guide bars 18 and 19. The other end of each of the guide bars 18 and 19 is held by a fourth fixture frame 24.

A position sensor 20 is provided at a position of the image pickup element holder 17 opposite to the scale 14. The position sensor 20 is connected to the main substrate 12 via the barrel flexible printed board 13.

The fourth fixture frame 24 holds a U yoke 22 having a U shape whose opening end faces the image pickup element holder 17 side, and the U yoke 22 extends in the optical axis direction. A magnet 21 is adhered to an inner surface of an upper flat plate part among two flat plate parts that extend in the optical axis direction in the U yoke 22. An H yoke 23 having an H shape is adhered to the opening end of the U yoke 22, as shown in FIGS. 5 and 8.

The coil 15, the U yoke 22, the H yoke 23, and the magnet 21 constitute the voice coil motor (VCM) that serves as the actuator.

As shown in FIGS. 5, 8, and 16, the lower flat plate part of the U yoke 22 perforates the inside of the coil 15 (air core member 15a). Thereby, the coil 15 is arranged in the magnetic flux formed by arranging the magnet 21 opposite to the lower flat plate part of the U yoke 22.

Thus, when the current is supplied to the coil 15 via the VCM flexible printed board 16, the Lorentz force acts in the direction orthogonal to the current and the magnetic field, and the VCM lens holder 6 moves in the optical axis direction while guided by the guide bar 18.

At this time, the scale 14 moves together with the VCM lens holder 6 relative to the position sensor 20, and the position sensor 20 outputs a detection signal corresponding to its moving amount. A CPU (not shown) mounted on the main substrate 12 detects a position of the VCM lens holder 6 in the optical axis direction based on the detection signal from the position sensor 20. The CPU controls the direction of the current flowing in the coil 15 and a current amount based on a difference between the detection position and the target position. Thus, the VCM lens holder 6 can be moved to the target position.

Referring now to FIGS. 1, 14, 15, and 17-20, a description will be given of a mechanism for restricting a movement of the VCM lens holder 6. FIGS. 14 and 15 show a relationship between the stopper and the VCM lens holder 6 in the collapsed state and in the wide-angle state, respectively (or are D-D sectional views shown in FIG. 3). FIG. 17 shows a structure around the VCM lens holder 6 in the collapsed state. FIG. 18 shows a relationship among the stopper, the fixed barrel 9, and the cam barrel 8 in the collapsed state (or is an E-E sectional view shown in FIG. 3). FIGS. 19 and 20 show a relationship among the stopper, the fixed barrel 9, and the cam barrel 8 in the collapsed state and in the wide-angle state, respectively.

In these figures, reference numeral 26 denotes a stopper as a movement restricting member having a shaft member 26a at both ends thereof. The stopper 26 further includes a cam member 26b, an engaging claw 26c, and a spring hook member 26d. Reference numeral 27 denotes a torsion spring as a biasing or forcing member having a movable arm 27a and a fixed arm 27b.

Each shaft member 26a of the stopper 26 is held rotatably by a bearing 9d provided to the fixed barrel 9. The stopper 26 is configured to rotate (move) in a direction (in a surface orthogonal to the optical axis in this embodiment) different from the optical axis direction between a (first) position at which the engaging claw 26c enters the route of the VCM lens holder 6 and a (second) position off the route.

The torsion spring 27 is arranged at the outer circumference of the stopper 26. The movable arm 27a is engaged with the spring hook member 26d, and the fixed arm 27b is engaged with a spring hook member 9e of the fixed barrel 9. The torsion spring 27 forces the stopper 26 in such a rotating direction (in the arrow N direction shown in FIG. 20 or toward the second position) that the engaging claw 26c can retreat from the route of the VCM lens holder 6

As shown in FIGS. 15 and 20, in the image picking-up state between the wide-angle state and the telephoto state, the cam 26b of the stopper 26 is inserted into the stopper retreat groove member 8f formed in the inner circumference of the cam barrel 8 that serves as the stopper driving member, and does not contact the cam barrel 8. Therefore, the engaging claw 26c of the stopper 26 is located at the (second) position off the route of the VCM lens holder 6 due to the force by the torsion spring 27.

As shown in FIGS. 14 and 19, when the VCM lens holder 6 is moved by the VCM from the wide-angle position (image picking-up position) to the collapsed position (retreated position), the lens barrel 2 transfers from the wide-angle state to the collapsed state. At this time, the cam barrel 8 rotates in the arrow L direction shown in FIG. 19, and the end surface (driver) 8h of the stopper retreat groove member 8f contacts the cam member 26b of the stopper 26, and rotates the stopper 26 in the arrow M direction against the force of the torsion spring 27. Thereby, the engaging claw 26c of the stopper 26 enters the route of the VCM lens holder 6 (first position) as shown in FIG. 14.

The engaging claw 26c that has entered the route of the VCM lens holder 6 opposes to or contacts the front end surface (end surface on the object side) of the sleeve member 6a of the VCM lens holder 6. This configuration restricts a movement of the VCM lens holder 6 from the collapsed state in the optical axis direction. Therefore, even when the camera 1 receives a vibration or a shock, the VCM lens holder 6 is prevented from moving and colliding with the third lens holder 5 on the front side or the filter holding part 31 on the back side.

It is understood by comparing FIG. 14 with FIG. 15 that the third lens holder 5 adjacent to the VCM lens holder 6 along the optical axis direction little moves in the optical axis direction in a transfer from a wide-angle state to the collapsed state. On the other hand, the VCM lens holder 6 significantly moves in the optical axis direction (or backwardly). In other words, a moving amount of the VCM lens holder 6 is larger than a moving amount of the third lens holder 5 in the transfer from the wide-angle state to the collapsed state.

Since the third lens holder 5 is thus separated from the VCM lens holder 6 by a distance S1, as shown in FIG. 14 in the collapsed state, a movement of the VCM lens holder 6 cannot be restricted only by bringing the third lens holder 5 into contact with the VCM lens holder 6 in the collapsed state.

Accordingly, this embodiment inserts the stopper 26 separate from the third lens holder 5, into the route of the VCM lens holder 6 from a direction different from the optical axis direction. Thereby, even when the third lens holder 5 is distant from the VCM lens holder 6 by a distance S2 in the collapsed state (or even when a moving amount of the third lens holder 5 up to the collapsed state is larger than a moving amount of the VCM lens holder 6), a movement of the VCM lens holder 6 from the retreated state can be restricted.

Second Embodiment

Referring to FIGS. 21 to 24, a description will be given of a lens barrel (lens apparatus) according to a second embodiment of the present invention. The overall structure of the lens barrel in this embodiment is similar to that of the lens barrel 2 of the first embodiment. Therefore, in this embodiment, a component that is common to or has a common function of that of the first embodiment will be designated by the same reference numeral as the first embodiment, and a description of only differences from the first embodiment will be given.

Figure 21:
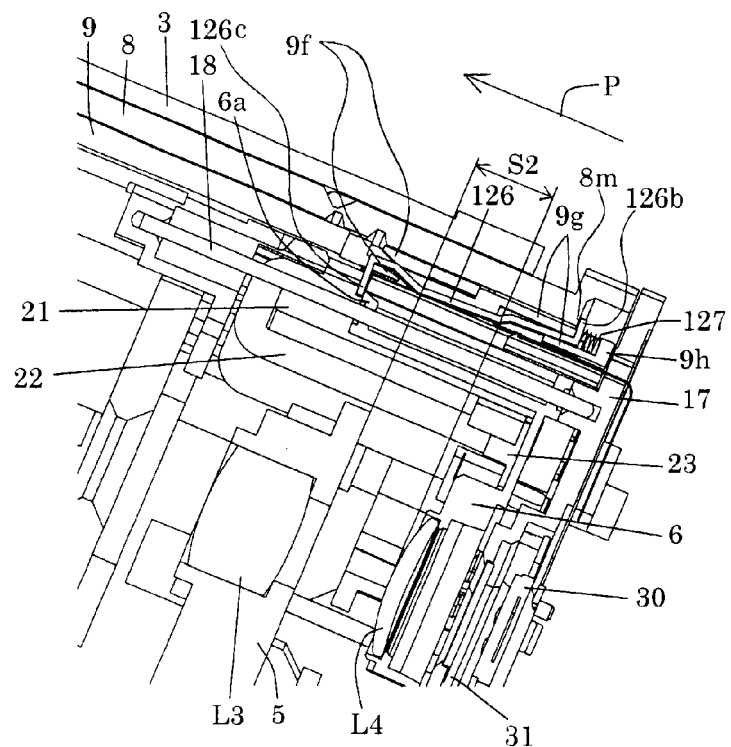
FIG. 21 is a D-D sectional view showing a structure around a stopper in a collapsed state of a lens barrel according to a second embodiment.
Figure 22:
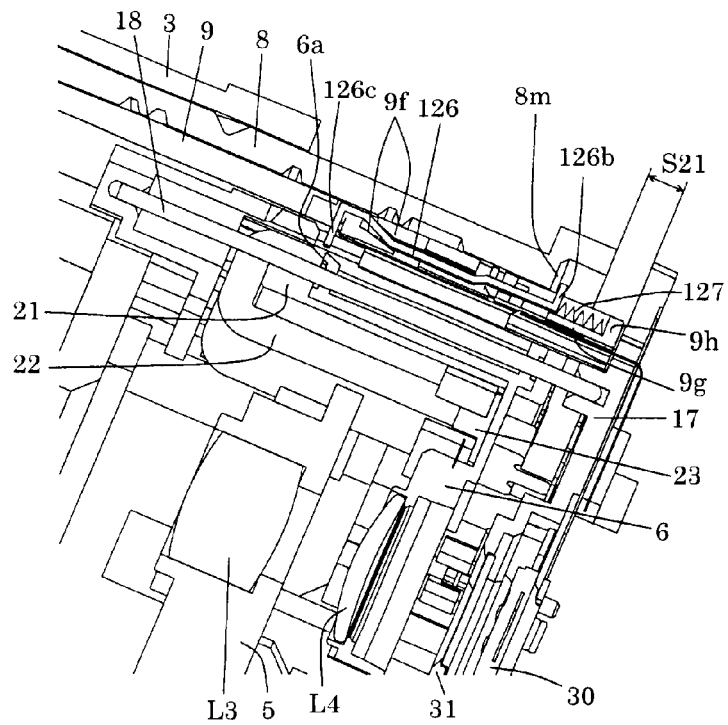
FIG. 22 is the D-D sectional view showing the structure around the stopper in a wide-angle state of the lens barrel according to the second embodiment.
Figure 23:
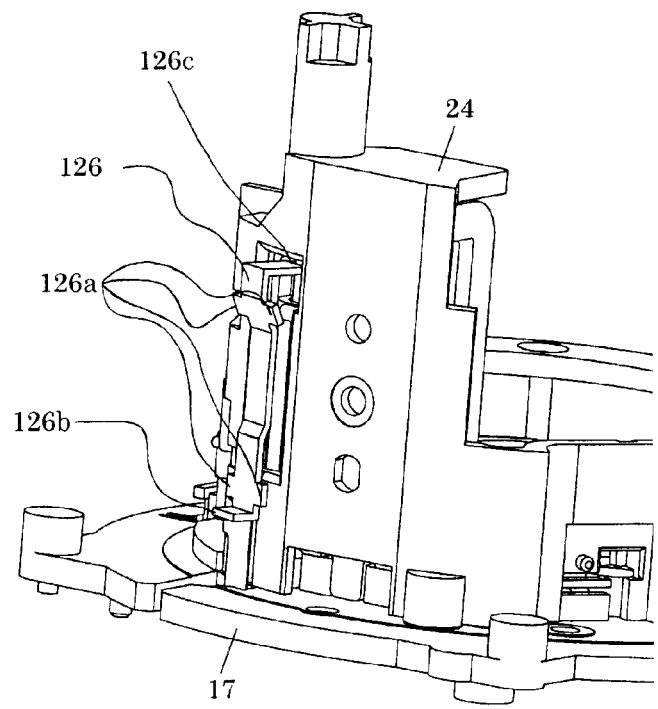
FIG. 23 is a perspective view showing the stopper in the collapsed state of the lens barrel according to the second embodiment.
Figure 24:
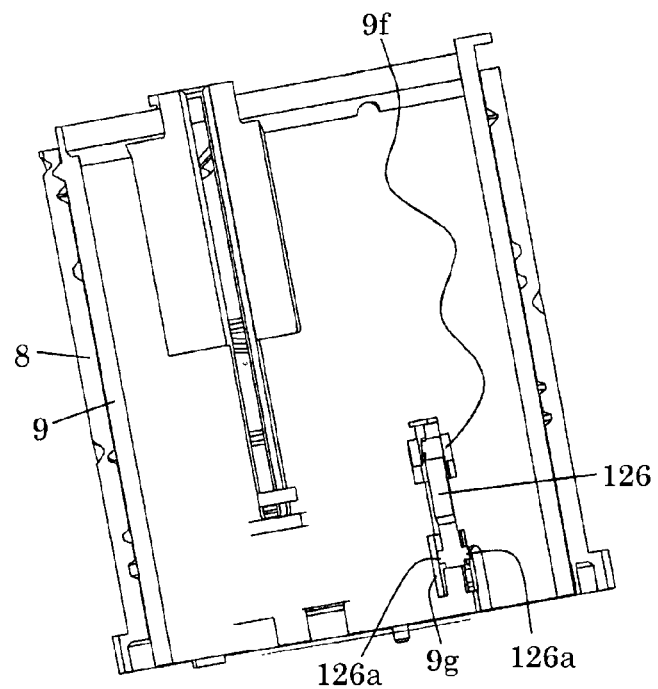
FIG. 24 is an E-E sectional view showing a relationship among the stopper, the cam barrel, and the fixed barrel in the collapsed state of the lens barrel according to the second embodiment.

FIGS. 21 and 22 show a relationship between the stopper 126 and the VCM lens holder 6 in the retracted state and the wide-angle state, respectively (and correspond to the D-D section shown in FIG. 3). FIG. 23 shows the stopper 126 in the collapsed state. FIG. 24 shows a relationship among the stopper 126, the fixed barrel 9, and the cam barrel 8 in the collapsed state (and corresponds to the E-E section shown in FIG. 3).

The stopper 126 includes front and back sliders 126*a*, a contact member 126*b* provided at the back end, and an engagement claw 126*c* provided at the front end. Reference numeral 127 denotes a spring (biasing member) arranged between the back end of the stopper 126 and a projection 9*h* of the fixed barrel 9.

The slider 126*a* is supported by guide members 9*f* and 9*g* of the fixed barrel 9. The spring 127 forces the stopper 126 ahead or toward the arrow P direction shown in FIG. 21.

In the wide-angle state shown in FIG. 22 (or the image picking-up state between the wide-angle state and the telephoto state), the contact member 126*b* of the stopper 126 does not contact an end surface 8*m* of the cam barrel 8. Therefore, by the force of the spring 127, the engaging claw 126*c* is located at a (second) position off the route of the VCM lens holder 6.

When the VCM lens holder 6 is moved by the VCM from the wide-angle position to the collapsed position, the lens barrel 2 transfers from the wide-angle state to the collapsed state shown in FIG. 21. At this time, the cam barrel 8 rotates and backwardly moves in the optical axis direction, and the end surface (driver) 8*m* of the cam barrel 8 contacts the contact member 126*b* of the stopper 126, backwardly moving the stopper 126 against the force of the spring 127 by the distance S21. Thereby, the slider 126*a* of the stopper 126 slides along a bevel surface of the guide member 9*f* of the fixed barrel 9, and the engaging claw 126*c* of the stopper 126 moves in a direction different from the optical axis direction (or orthogonal to the optical axis), and enters the route of the VCM lens holder 6 (first position).

The engaging claw 126*c* that has enters the route of the VCM holder 6 faces or contacts the front end surface (or the end surface at the object side) of the sleeve member 6*a* of the VCM lens holder 6. This configuration restricts a movement of the VCM lens holder 6 in the optical axis direction from the collapsed state. Therefore, even when the camera 1 receives a vibration or a shock, the VCM lens holder 6 is prevented from moving and colliding with the third lens holder 5 on the front side or the filter holding part 31 on the back side.

Similar to the first embodiment, this embodiment inserts the stopper 26 separate from the third lens holder 5, into the route of the VCM lens holder 6 from a direction different from the optical axis direction. Therefore, even when the third lens holder 5 is distant from the VCM lens holder 6 by a distance S2 in the collapsed state (or even when a moving amount of the third lens holder 5 up to the collapsed state is larger than a moving amount of the VCM lens holder 6), a movement of the VCM lens holder 6 from the retreated position can be restricted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, each of the above embodiments describes the lens apparatus and the image pickup apparatus that uses the VCM having no stopping and holding power. However, the present invention is applicable to the lens apparatus and the image pickup apparatus, which uses an actuator that inherently has the stopping and holding power, such as a stepping motor or a vibration type motor, so as to surely restrict a movement of the lens holder from the retreated position.

This application claims the benefit of Japanese Patent Application No. 2008-197759, filed Jul. 31, 2008, which is hereby incorporated by reference herein in its entirety.

What is claimed is:

1. A lens apparatus comprising:
    a first lens holding member configured to hold a lens;
    an actuator configured to move the first lens holding member in an optical axis direction, the lens apparatus transferring to a retracted state by moving the first lens holding member to a retracted position via the actuator from an image picking-up state;
    a stopper configured to be capable of moving in a direction different from the optical axis direction between a first position at which the stopper restricts a movement, to an object side in the optical axis direction, of the first lens holding member and a second position off the first position; and
    a driving member configured to move the stopper from the second position to the first position relative to the first lens holding member that has moved to the retreated position.

2. The lens apparatus according to claim 1, wherein the driving member moves around an optical axis or in the optical axis direction, and moves the stopper from the second position to the first position.

3. The lens apparatus according to claim 2, wherein a moving amount of the first lens holding member that transfers from the image pick-up state to the retreated state is larger than a moving amount of a second lens holding member adjacent to the first lens holding member along the optical axis direction.

4. The lens apparatus according to claim 1, wherein the driving member is a cam barrel configured to rotate around and optical axis and to move, in an optical axis direction, another lens different from the lens held by the first lens holding member.

5. The lens apparatus according to claim 1, wherein the actuator is a voice coil motor.

6. An image pickup apparatus comprising a lens apparatus that includes a first lens holding member configured to hold a lens, an actuator configured to move the first lens holding member in an optical axis direction, the lens apparatus transferring to a retracted state by moving the first lens holding member to a retracted position via the actuator from an image picking-up state, a stopper configured to be capable of moving in a direction different from the optical axis direction between a first position at which the stopper restricts a movement, to an object side in the optical axis direction, of the first lens holding member and a second position off the first position, and a driving member configured to move the stopper from the second position to the first position relative to the first lens holding member that has moved to the retreated position.

* * * * *